(12) United States Patent
Singh

(10) Patent No.: US 6,915,395 B1
(45) Date of Patent: Jul. 5, 2005

(54) ACTIVE ADDRESS CONTENT ADDRESSABLE MEMORY

(75) Inventor: Raghvendra Singh, Cupertino, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/564,202

(22) Filed: May 3, 2000

(51) Int. Cl.[7] ............................................. G06F 12/00
(52) U.S. Cl. ..................................... 711/154; 711/108
(58) Field of Search .............................. 711/154, 108; 712/220, 228, 225, 229

(56) References Cited

U.S. PATENT DOCUMENTS

| | | | | |
|---|---|---|---|---|
| 5,761,476 A | * | 6/1998 | Martell | 395/395 |
| 6,170,051 B1 | * | 1/2001 | Dowling | 712/225 |
| 6,298,431 B1 | * | 10/2001 | Gottlieb | 712/28 |
| 6,341,341 B1 | * | 1/2002 | Grummon et al. | 712/228 |

FOREIGN PATENT DOCUMENTS

| | | | |
|---|---|---|---|
| GB | 2321544 | 7/1998 | ............. G06F/9/38 |
| WO | WO 99/31594 | 6/1999 | ........... G06F/12/10 |

OTHER PUBLICATIONS

S. Wallace et al, "Threaded Multiple Path Execution", *Annual International Symposium on Computer Architecture, ISCA 1998, IEEE Comp. Soc.*, pp 238–249.

* cited by examiner

*Primary Examiner*—Kimberly McLean-Mayo
(74) *Attorney, Agent, or Firm*—Martine Penilla & Gencarella LLP

(57) ABSTRACT

A present invention provides a system and method for avoiding memory hazards in a multi-threaded CPU which shares an L-1 data cache. The system includes a CPU and an AACAM. The AACAM is capable of copying memory addresses from the two or more threads being processed by the CPU. The method provides for comparing the AACAM memory address with the active threads to avoid memory hazards by thread switching before the memory hazard occurs.

9 Claims, 4 Drawing Sheets

ACTIVE ADDRESS CONTENT ADDRESSABLE MEMORY

BACKGROUND OF THE INVENTION

1. Field of the Invention

The present invention relates to memory systems for multi-threading. More particularly, the present invention relates to a system and method for avoiding memory hazards in a retrofitted multi-threaded CPU.

2. The Background Art

Modern microprocessors spend a significant fraction of their time waiting on cache misses. During this wait time functional units and other pipeline resources in a CPU are mostly idle. By way of example, when the Sun UltraSPARC-II performance was analyzed using hardware counters and related tools, it was found that more than 50% of execution time was spent idle waiting for L-2 cache or memory.

Multi-threading is one well-known technique which utilizes the CPU wait time to execute another program or parts of the same program. With respect to CPUs, multi-threading provides CPUs with the ability to share CPU resources to execute two or more threads without intervention from the operating system. For CPUs a thread is the execution of instructions from a particular program.

The question of when to switch from one thread to another has been previously addressed. In the MIT Alewife project the SPARC processor had the ability to thread switch on a cache miss. More recently, a threaded Power PC has been designed by IBM/Northstar and Pulsar. Other machines such as the Tera CPU developed by Tera Systems also implement a flavor of thread switching on memory access. Each of these processors were designed from their inception as a multi-threading processor.

However, none of these prior art multi-threading processors were initially a CPU of single thread design which was later retrofitted to perform multi-threading.

The prior art also teaches the use of memory models to define the semantics of memory operation. The purpose of memory models is to specify what constraints are placed on the order of memory operations. The memory models apply both to uniprocessors and to shared-memory multiprocessors. Formal memory models are necessary in order to precisely define the interactions between multiple processors and input/output devices in a shared-memory configuration.

By way of example the SPARC-V9 architecture provides a model that specifies the behavior observable by software on SPARC-V9 systems. The SPARC-V9 architecture defines three different memory models: Total Store Order (TSO), Partial Store Order (PSO), and Relaxed Memory Order (RMO). The most restrictive memory model is the Total Store Order memory model. All SPARC-V9 processors must satisfy the Total Store Order model or a more strongly ordered model, e.g. Sequential Consistency, to ensure SPARC-V8 program compatibility.

The memory models specify the possible order relationship between memory reference instructions issued by a processor and the order and visibility of these instructions as sent by other processors. The memory model is intimately intertwined with the program execution model for instruction.

Typically a CPU issues instructions which are collected, reordered, and then dispatched to an execution unit. Instruction reordering allows operations to be performed in parallel. The reorderding of instruction is constrained to ensure that the results of program execution are the same as they would be if performed in program order. Typically, the CPU is allowed to reorder instructions, provided the reordering does not violate any of the data flow constraints for registers or for memory.

The typical data flow constraints to avoid or prevent memory hazards include:

1. An instruction cannot be performed until all earlier instructions that set a register it uses have been performed (read-after-write hazard; write-after-read hazard).
2. An instruction cannot be performed until all earlier instructions that use a register it sets have been performed (write-after-read hazard).
3. A memory-reference instruction that sets (stores to) a location cannot be performed until all previous instructions that use (load from) the location have been performed (write-after-read hazard).
4. A memory reference instruction that uses (loads) the value at a location cannot be performed until all earlier memory-reference instruction that set (store to) the location have been performed (read-after-write hazard).

Therefore to achieve functional correctness for a single threaded processor which is retrofitted to perform multi-threading, it would be beneficial to provide a system and method which avoids memory model hazards for a retrofitted multi-threaded processor.

SUMMARY OF THE INVENTION

The present invention provides a system for preventing memory hazards in a retrofitted single threaded CPU configured to perform multi-threaded processing. The retrofitted CPU shares its resources amongst the threads, and this includes a level one (L-1) data cache configured to receive at least two threads and a logic component coupled to the L-1 data cache. The logic component is referred to as an Active Address Content Addressable Memory (AACAM). The AACAM is configured to avoid memory hazards and is adjacent the retrofitted CPU. The AACAM avoids memory hazards by ensuring that the same physical memory address cannot be active in two threads at the same time.

A present invention provides a method and system for avoiding memory hazards in a retrofitted single threaded CPU configured to perform in a multi-threaded environment. The method includes enabling a first thread in a CPU. The first thread in the CPU uses a first store buffer, a first load buffer, and a L-1 data cache. A thread switch then occurs when the CPU switches out the first thread and a second thread becomes active. At least one physical memory address from the first store buffer or the first load buffer is copied to an active address content addressable memory (AACAM). A second thread in a CPU is enabled and uses a second store buffer, second load buffer, and the same L-1 data cache. The method then proceeds to determine if there is a match between the physical memory address in the second store buffer or the second load buffer and the copied memory address in the AACAM. If there is a match the method performs a thread switch to avoid memory hazards.

In operation, the present invention is a method for avoiding inter-thread hazards in a multi-threaded processor sharing an L-1 data cache. The present invention provides a method to avoid memory hazards to the Total Store Order (TSO) memory model. To overcome memory hazards, the AACAM ensures that the same physical memory address cannot be active in two different threads at the same time.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
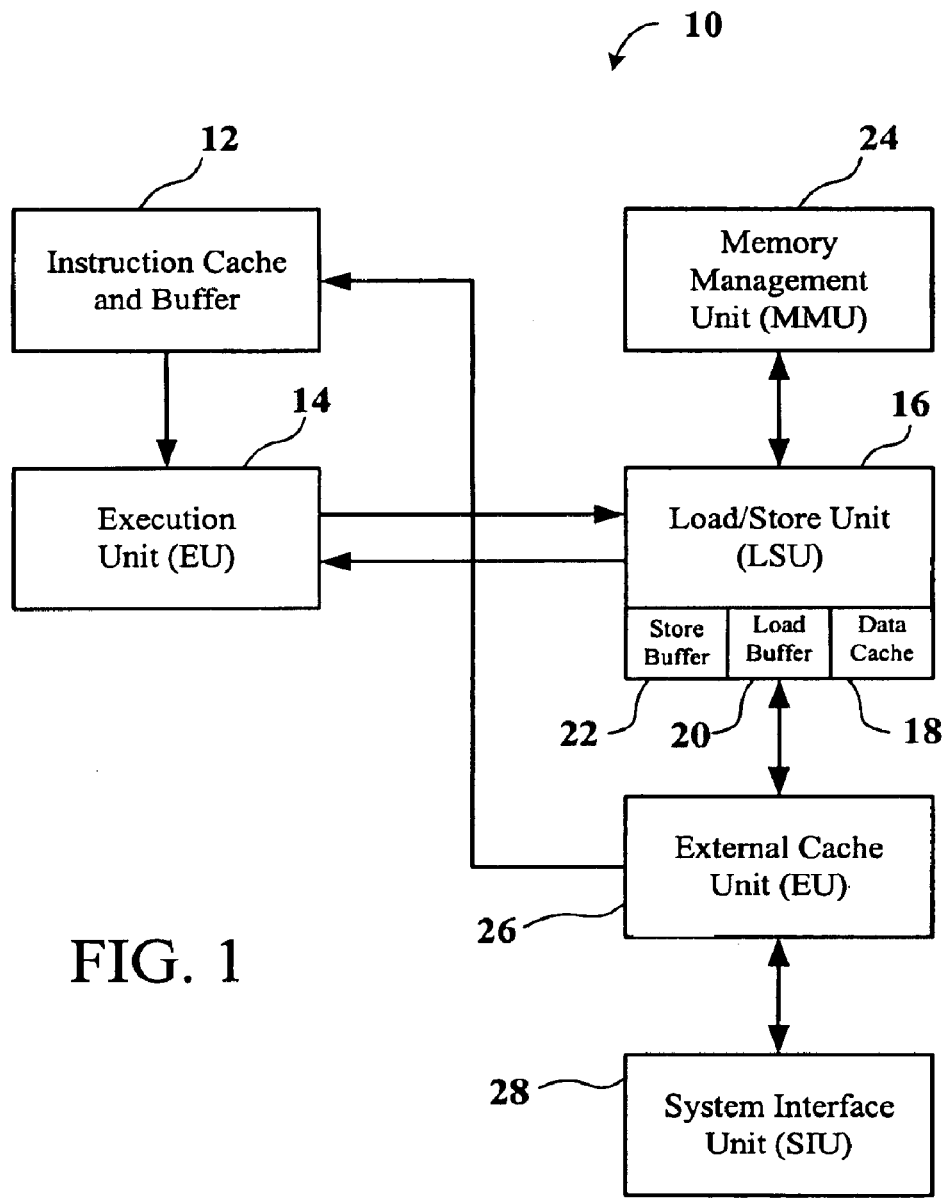
FIG. 1 is a block diagram of a representative prior art single thread Central Processing Unit.

Referring to FIG. 1 there is shown an illustrative example of a prior art Central Processing Unit (CPU) 10. Persons with ordinary skill in the art will appreciate that the illustrative example comprises a typical hardware configuration. Additionally, persons of ordinary skill in the art shall appreciate that there are similar configurations which can be used to perform similar functions with data flow.

The illustrative CPU 10 includes an instruction cache 12 from which instructions are fetched. Instructions other than the loads and stores are executed by the execution unit 14. Load store instructions are executed by the load store unit 16. The load store unit 16 calculates the address for load store instructions. The load store unit 16 is also responsible for generating the virtual address of all loads and stores, for accessing the level one (L-1) data cache 18, for decoupling load misses from the pipeline through the load buffer 20, and for decoupling stores through the store buffer 22. The address is translated by the memory management unit 24. The translated address is used by the load store unit 16 to look up the L-1 data cache 18 and determine if the address has been loaded into the data cache 18. If the address is found in the level one data cache 18, data is read from the data cache 18 and returned to the pipeline. If the address is not found, a request is sent to the level two (L-2) external cache unit 26.

The L-2 external cache unit 26 looks to the L-2 external cache to see if the address has been loaded into the L-2 external cache previously. If the address is found, data is returned from the L-2 external cache unit 26. If the address is not found, the L-2 cache unit 26 sends a request to the system interface unit 28.

Restrictive memory models are well-known in the art of CPU design. By way of example the SPARC-V9 architecture provides a model that specifies the behavior observable by software on SPARC-V9 systems. The SPARC-V9 architecture defines three different memory models: Total Store Order (TSO), Partial Store Order (PSO), and Relaxed Memory Order (RMO). The most restrictive memory model is the Total Store Order memory model. All SPARC-V9 V9 processors must satisfy the Total Store Order model or a more strongly ordered model, e.g. Sequential Consistency, to ensure SPARC-V8 program compatibility.

Figure 2:
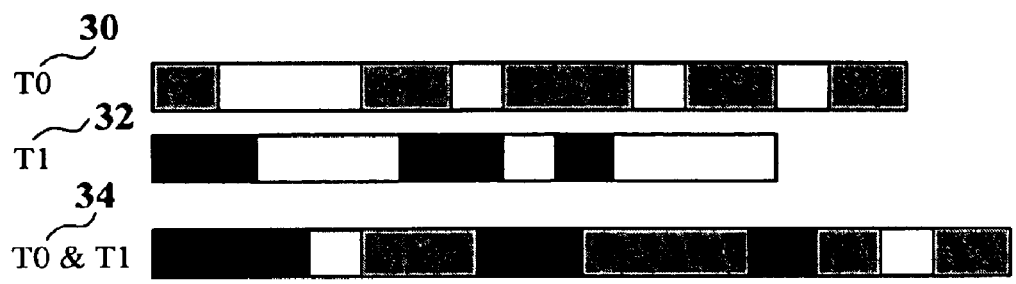
FIG. 2 is a block diagram showing the execution flow in a vertically threaded processor.

Referring to FIG. 2 there is shown the execution flow for an illustrative example depicting multi-threading. FIG. 2 shows the activity for thread 0 (T0), 30, and thread 1 (T1), 32, as blocks which are shaded gray and black, respectively. The blocks which are empty represent unused or idle CPU resources. The multi-threading CPU generates thread (T0&T1), 34, by combining threads 30 and 32 without operating system intervention. In the multithreading CPU (T0&T1), 34, there are instances when a first thread is active and the second thread is inactive, when a second thread is active and the first thread is inactive, and both threads are inactive. However, both threads may not be simultaneously active.

Thread switching may occur during any miss of on-chip cache, translation look aside buffer (TLB), and during stalls in the pipeline. Generally, thread switches typically occurs on a cache miss. Additionally, thread switches may also occur at the expiration of a thread time counter. It shall be appreciated by those skilled in the art that thread switching is not limited to switching during cache misses or at the expiration of a thread time counter. Additionally it shall be appreciated by those skilled in the art having the benefit of this disclosure that thread switching may also occur during stalls in the pipeline.

Figure 3:
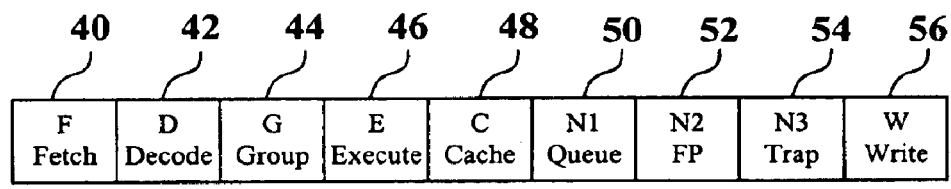
FIG. 3 is a block diagram of an UltraSPARC-II pipeline stages.

Referring to FIG. 3, as well as FIG. 1, there is shown a block diagram of an illustrative example of pipeline stages. The illustrative example is of the UltraSPARC-II pipeline stages. The core pipeline includes blocks that complete fetch, decode, issue and execute instructions. The core pipeline accesses the instruction and data caches of FIG. 1.

The illustrative UltraSPARC-II pipeline has nine stages as shown in FIG. 3. In the Fetch (F) stage 40 of the pipe up to four instructions are fetched from the L1 instruction cache 12. In the Decode (D) stage 42 the fetched instructions are decoded and branch prediction is completed. At the end of the Decode (D) stage 42 instructions are written into the issue queue. The Grouping (G) stage 44 is where instructions read the register file, and are assigned to different execution pipes. After the Grouping stage 44, the Execute (E) stage 46 is where most integer instructions complete execution and address computation for load/store instructions are completed. In the Cache (C) stage 48, the L-1 data cache 18 is accessed. Address translation also happens in the C stage. Early in the N1 stage 50 the result of L-1 data cache 18 compare is known, and late in the N1 stage 50 loads that miss in L-1 data cache 18 are queued in the load buffer 20. In the N2 stage 52 floating point instructions complete execution. In the N3 stage 54 traps are resolved and in the Write (W) stage 56 all instructions commit their results into the architectural register file. It shall be appreciated by those skilled in the art hat stalls in the illustrative pipeline described above may cause a thread switch.

Handling inter thread load/store hazards is a challenging problem for multi-threaded processors. As described above memory hazards include Read-after-Write (RAW) hazards, Write-after-Read (WAR) hazards, Read-after Read (RAR) and Write-after-Write (WAW) hazards. The following example provides an illustration of a RAW hazard caused by having two threads running on a CPU in which both threads share the L-1 data cache.

| Thread 0 | Thread 1 |
|---|---|
| 1d A (D-cache miss, L2-cache hit) | |
| TS (thread switch) | |
| . | . |
| . | st A enters SB (D-cache_hit = 0) |
| . | TS |
| D-cache fill for A | . |
| TS | . |
| . | st A updates L2-cache but not D-cache (now D-cache & L2-cache inconsistent) |

In the illustrative example provided above, thread 0 attempts to load an address A and obtains a cache miss in the L-1 data cache, but a hit in L-2 cache. Following the thread 0 attempt to load address A, a thread switch is completed and thread 1 becomes active.

Thread 1 then attempts a store to the same address A, but since thread O's load has not completed yet, thread 1's store results in a L-1 data cache miss. The attempted store then enters thread 1's store buffer with its L-1 data cache hit flag set to 0. Following this store there is another thread switch.

Thread 0 then becomes active again and the outstanding load is completed so that the load data is filled in the L-1 data cache and a corresponding tag RAM is updated. Following the load fill in the L-1 data cache, there is another thread switch.

Thread 1 then becomes active again and the outstanding store in thread 1 is then completed. However, since its L-1 data cache hit bit is set to 0 for thread 1, thread 1 does not write to the L-1 data cache but only to L-2 cache. The L-1 data cache now has stale data that could erroneously be read by a future load. Thus, the L-1 data cache and L-2 cache have data in the L-1 data cache and the L-2 cache that are inconsistent.

Referring back to the illustrative example of an UltraSPARC-II processor, an update is considered globally visible by other CPUs after the update is completed by the L-2 external cache 26, but not L-1 data cache 18. One source for TSO violations is that the store buffer 22 updates the L-1 data cache before the L-2 external cache 26. The updating of the L-2 external cache 26 is completed within a few cycles. However, these few cycles may cause "out-of-order" early visibility of an updated variable that is otherwise not visible yet to all other outside processors. This out of order visibility causes a memory hazard to the CPU.

The present invention overcomes memory hazards caused by two or more threads sharing the L-1 data cache. More particularly, the present invention avoids memory hazards in a retrofitted multi-threaded CPU in which two or more threads share the L-1 data cache of the retrofitted multi-threaded CPU. The memory hazards include RAW, WAR, RAR, and WAW hazards.

The system and method of the present invention operate on a single threaded CPU processor which has been retrofitted to operate as multi-threaded processor. The retrofitted CPU shares an L-1 data cache between two or more threads. The sharing of the L-1 data cache may cause violations to the memory model, such as the TSO memory model, because addresses will be visible to the L-data 1 data cache level, rather than at the L-2 external cache level.

Figure 4:
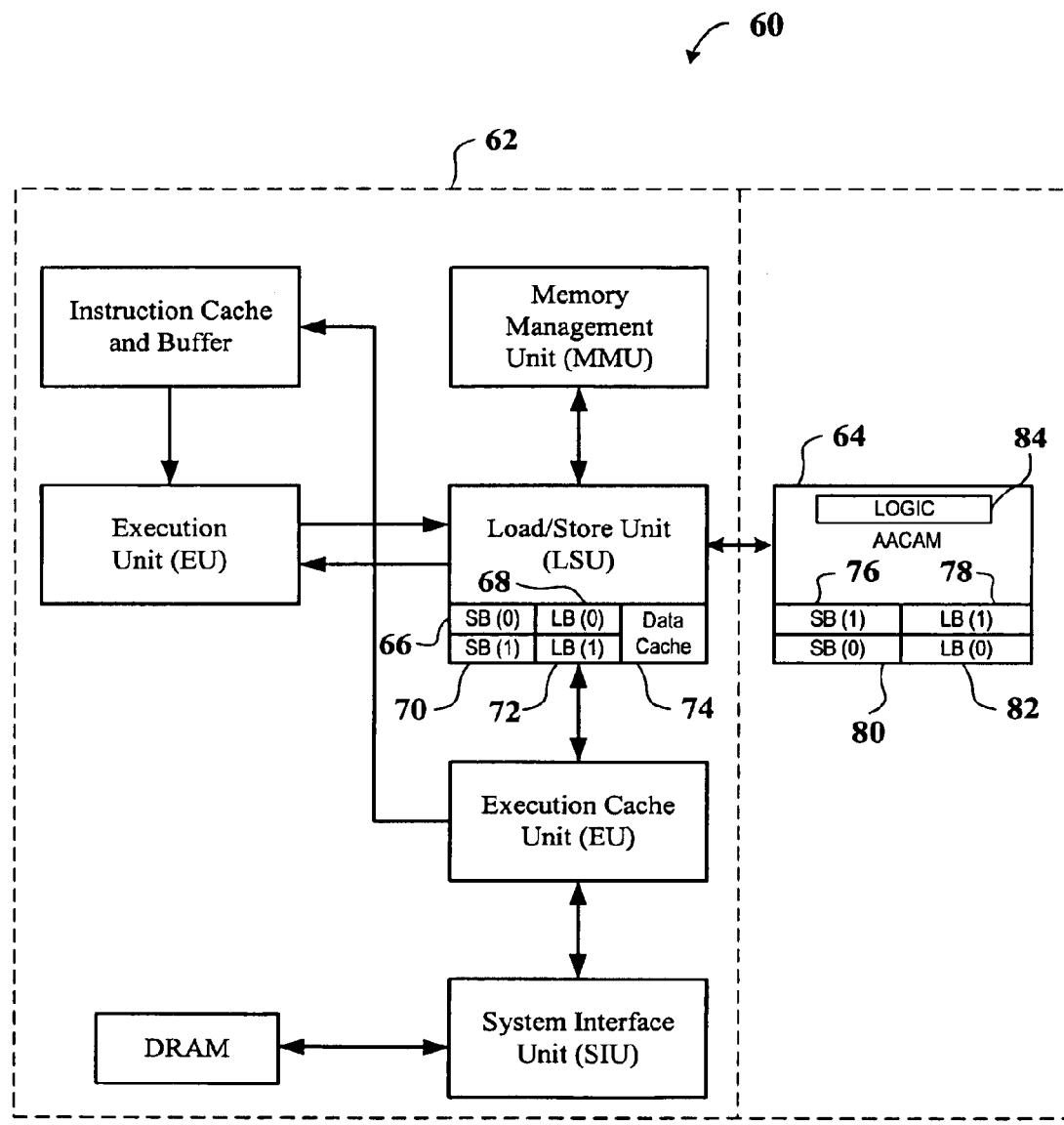
FIG. 4 is a block diagram of a retrofitted CPU having an AACAM.

Referring to FIG. 4 there is shown a block diagram of the preferred embodiment of a multi-threaded CPU 60 having a retrofitted single threaded CPU 62 and an AACAM module 64. The AACAM module 64 is located outside the former single threaded CPU core floor plan 62. In the retrofitted multi-threaded CPU 60, the retrofitted CPU module 62 has a first CPU store buffer 66 and a first CPU load buffer 68 which are associated with a first thread, T0. The retrofitted CPU module 62 also includes a second CPU store buffer 70 and a second CPU load buffer 72, which are associated with a second thread, T1. The multi-threaded CPU 60 includes an AACAM 64 floor plan adjacent the retrofitted CPU module 62. As previously described, the multi-threaded CPU combines the first thread, T0 and the second thread, T1, without operating system intervention while using a shared L-1 data cache.

The AACAM performs the function of copying the physical memory address of the load/store unit entries from the "switched out" thread of the CPU module 62 to an AACAM memory. The AACAM includes at least one entry. Preferably, the AACAM includes a first AACAM memory and a second AACAM memory, each of which receive the copies of the memory addresses from a first thread and second thread, respectively. The AACAM memory is populated at thread switch time with an active address snapshot of the physical memory address of the CPU load/store buffer of the thread that was switched or "switched out."

In operation, the active address snapshot of the memory address in the load/store buffer is copied to a first AACAM memory or a second AACAM memory. An illustrative example of the entries in the AACAM is provided in FIG. 5. For the first thread, T0, the AACAM 64 includes at least one entry 76 for storing the copied physical memory addresses from the second CPU store buffer 70, and at least one entry 78 for storing the copied memory address from the second CPU load buffer 72. For the second thread, T1, the AACAM 64 includes at least one entry 80 for copying the memory address from the first CPU store buffer 66 and at least one entry 82 for storing the copied memory address from the first CPU load buffer 68. Depending on the performance of the CPU, the number of entries employed by the AACAM and the process of copying a memory address to the AACAM entry may vary.

The function of the AACAM 64 is to maintain coherency and memory order for the multi-threaded CPU 60 which performs pipeline processing. The AACAM 64 is provided to avoid memory hazards owing to having at least two threads sharing the L-1 data cache. T0 overcome memory hazards, the AACAM ensures the same physical memory address can not be active in two different threads at the same time. These hazards have been identified as including RAW, WAR, RAR and WAW hazards. As previously described these hazards cause memory model Violations, such as TSO violations, which occur when at least one of the load/store buffers updates the L-1 data cache before the L-2 external cache and the other thread reads the update in the L-1 data cache before the L-2 external cache is updated.

The AACAM 64 also includes a logic component 84 which compares the memory addresses in the AACAM with the memory addresses in the store buffer and load buffer of the active thread. If there is a match between the at least one AACAM entry and the memory addresses in the load/store buffer of the active, then a thread switch is initiated to avoid or prevent memory hazards.

Figure 5:
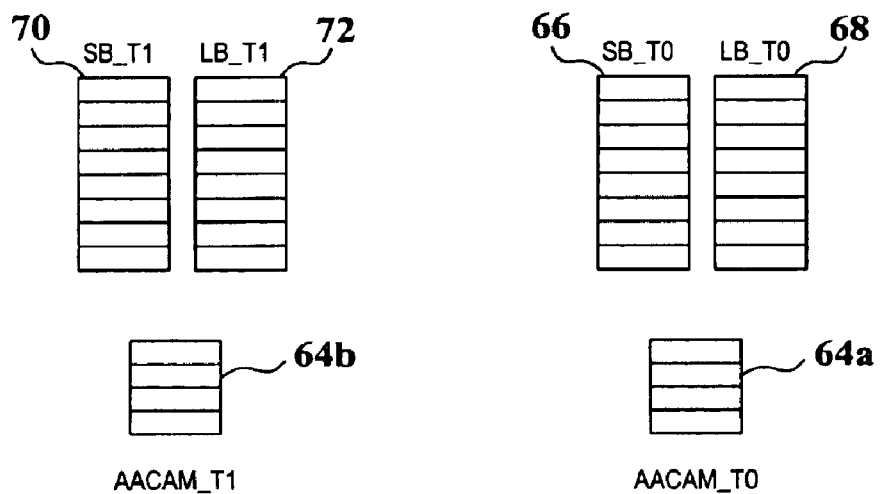
FIG. 5 is a logical block diagram of entries to the AACAM.

Referring to FIG. 5, as well as FIG. 4, there is shown a logical block diagram of the preferred embodiment for the AACAM module 64. In the preferred embodiment there is a first AACAM memory and a second AACAM memory. Each of the first AACAM memory and second AACAM memory preferably include four entries which receive the copied memory addresses from the load buffer and store buffer of the first thread and second thread, respectively. Preferably, the AACAM module is adjacent the multi-threaded CPU in which threads share the L-1 data cache.

The logic block diagram of FIG. 5 consists of AACAM entries holding the physical memory address for switched out threads. In the preferred embodiment, the AACAM 60 is configured to store copied addresses from the at least two threads processed by the multi-threaded CPU 60. In the multi-threaded environment of the illustrative block diagram, a first thread (T0) shares the L-1 data cache with the second thread (T1).

In operation, when there is a first thread switch from the first thread, T0, to the second thread, T1, thread 0 is switched out. When thread 0 is switched out, the first AACAM memory, 64a, identified as AACAM_T0, receives copies of the memory address information associated with the CPU thread 0 store buffer 66, identified as SB_T0, and CPU thread 0 load buffer 68, identified as LB_T0. Thus, a snapshot of the physical memory address from the switched out first thread (T0) is available in the AACAM for comparison with the memory address generated from active thread 1 which is being processed by the second store buffer 70 and second load buffer 72.

When a second thread switch occurs from thread two (T1) to thread one (T0), thread 1 is switched out. When thread 1 is switched out the second AACAM memory 64b, identified as AACAM_T1 receives copies of the memory address information associated with the thread 1 store buffer 70 and thread 1 load buffer 72 into the AACAM_T1 entries, 64b. As noted previously, the benefit of copying the memory address entries into the AACAM is that a snapshot of memory address for the second thread (T1) is available for comparison with the thread 0 which is being processed by the CPU.

By providing the ability to monitor the memory address entries from the switched out thread, the present invention avoids memory model hazards such as TSO hazards. The avoidance of memory model hazards is accomplished by providing a comparison of the switched out thread with the thread being processed by the L-1 data cache. By allowing a comparison between the active thread and the switched out thread, memory address matches can be performed between the active thread and the switched thread to avoid inter-thread memory hazards.

By way of example and not of limitation, for the RAW hazard example described above, memory model violations are avoided by performing thread switching when there is a match between the memory address of the switched out thread and the memory address of the active thread. Recall, that in the prior example, the thread 0 attempts a load of address A and incurs a miss in the L-1 data cache, but a hit in the L-2 cache. Following this attempt to complete a load there is a thread switch and thread 1 becomes active. With the AACAM, a snapshot of the memory address for the thread 0 attempt to load address A is visible to thread 1. For this example, the snapshot of thread 0 identifies a miss in the L-1 data cache. Thread 1 then receives a command to attempt to store address A. In attempting to store address A, thread 1 recognizes the L-1 data cache miss from thread 0. A match occurs between the active thread 1 and the switched out thread 0, which results in a thread switch from thread 1 back to thread 0. In thread the load of address A is completed. Another thread switch is then performed from thread 0 to thread 1. The AACAM for the switched out thread 0 is then empty since the load of address A has already been completed. Thus, since there is no longer a memory address match between the switched out thread 0 and the active thread 1, thread 1 proceeds with performing the store of address A. It shall be appreciated by those skilled in the art, that as a result of the AACAM thread 1 proceeds having avoided the prior memory hazards which are caused by sharing the L-1 data cache.

Figure 6:
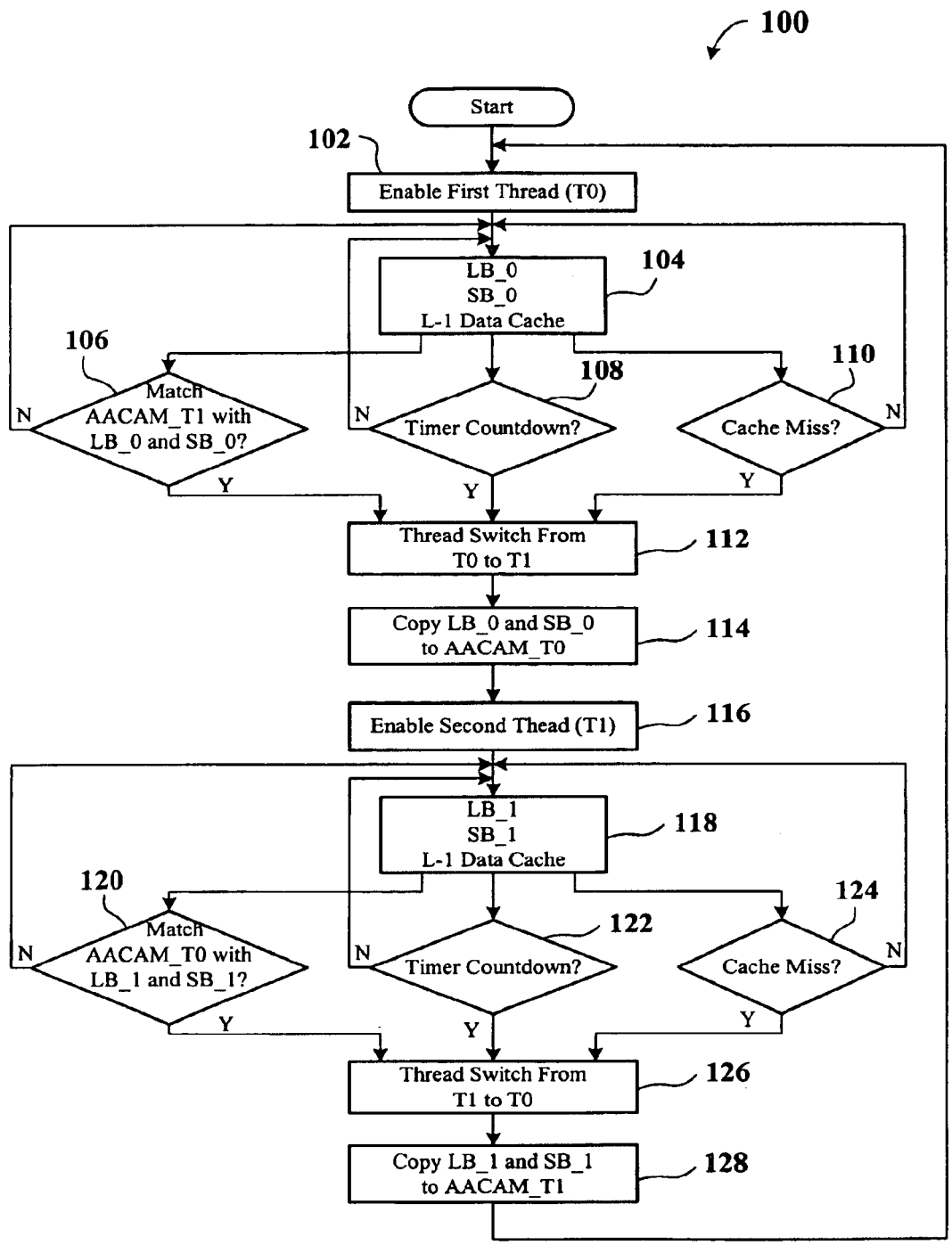
FIG. 6 is a flowchart of the method of operation for the AACAM operation.

Referring to FIG. 6, as well as FIG. 4 and FIG. 5, there is shown a flowchart of an illustrative method 100 of operation for the AACAM. In the retrofitted multi-threaded processor described above, inter-thread hazards are of particular concern because of the sharing of the L-1 data cache. T0 overcome inter-thread hazards, the AACAM provides a logic operation in which the same physical memory address cannot be active in two different threads at the same time. If a match of the same memory address between an active thread and a switched out thread occurs, the method provides for completing a thread switch to re-activate the switched out thread to complete its respective operation, thereby avoiding inter-thread hazards and memory model violations. The illustrative method described below is for two threads. However its shall be appreciated by those skilled in the art having the benefit of this disclosure that a similar method may be employed for two or more threads.

The method 100 begins by performing the act of enabling a first thread, 102. The active first thread, T0, submits core pipeline blocks as described above that complete fetch, decode and execute instructions. The active thread has access to the L-1 data cache. The method then proceeds to step 104.

At block 104, the method receives the pipeline instructions from the first thread, T0, and accesses a first store buffer 66 for the first thread, identified as SB_0, and/or a first load buffer 68 for the first thread, identified as LB_0, and the L-1 data cache 74. The method then proceeds to one of the three processes 106, 108 and 110. The transition to each the three processes may occur serially or in parallel or in such combination.

At decision diamond 106, it is determined whether there is a match between the memory addresses in the active thread and the copied memory addresses from the switched out thread in AACAM_T1, 64b. Since the SRAM has only been recently enabled there are no entries stored in AACAM_T1, 64b, thus a match can not be accomplished and the method proceeds to block 104.

However, if AACAM_T1, 64b, included filled entries then the decision diamond would determine whether a match between the at least one memory address in the store buffer 66 and load buffer 68 and the AACAM_T1, 64b existed. If a match exists, then the method would conduct a thread switch from the first thread, T0, to the second thread, T1, to avoid a memory hazard by proceeding to process 112. If a match does not exist, then the first thread continues to be processed as described in block 104.

At decision diamond 108, it is determined whether a countdown timer, well-known to those skilled in the art, has reached a pre-defined time interval. A countdown timer permits each thread to access system resources fairly. The countdown timer avoids having one thread with exclusive access to CPU resources. If the countdown timer has reached a pre-defined time interval, then the method proceeds to block 112 to conduct a thread switch. If the countdown timer has not reach a pre-defined time interval, then the first thread continues to be processed by the CPU at block 104.

At decision diamond 110, it is determined whether there is a cache miss, a stall in the pipeline, or some other on-chip cache miss well known to those skilled in the art. If an on-chip cache miss occurs then method proceeds to block 112, where a thread switch from first thread, T0, to the second thread, T1. If an on-chip cache miss does not occur, then thread T0 continues to be processed by the retrofitted CPU.

At block 112, a thread switch from the first thread, T0, to the second thread, T1, is completed. As discussed previously, the thread switch may arise from a variety of events including a match between the AACAM and the active thread, T0, the on-chip cache miss, and the timer countdown. The method then proceeds to the process 114.

At block 114, the AACAM copies the at least one physical memory address from the switched out thread T0 to the AACAM_T0. More specifically, the AACAM_T0 receives the memory addresses from the switched out thread T0 resident in the first thread store buffer, SB_0, 66 and first thread load buffer, LB_0, 68 to the AACAM_T0, 64a. The method then proceeds to process 116. At block 1116, the second thread, T1, is enabled. The active thread, T1, has access to the same L-1 data cache as the first thread T0. As previously described, the switched out thread, T0, is no longer active. The active thread, T1, submits core pipeline blocks. The method then proceeds to process 1118.

At block 118, pipeline instructions from the active second thread, T1, accesses the second thread's load buffer, identified as LB_1, and/or the second thread's store buffer, identified as SB_1, and the L-1 data cache. The method then proceeds to one of three processes 120, 122 or 124. The transition to each of the processes may occur serially or in parallel or in any such combination.

At decision diamond 120, it is determined whether there is a match between the memory addresses in the switched out thread, T0, which are copied to AACAM_T0 and the memory addresses in the store buffer SB_1, 70, and load buffer LB_1, 72 of active thread T1. If there is a match, then method proceeds to block 126 where a thread switch is performed to re-activate the switched out thread, T0. If there is no match the method continues to process thread 1 using the LB-1, SB_1 and L-1 data cache of process 118.

At decision diamond 122, the countdown time previously described in employed. If the countdown timer has reached a pre-defined time interval, then the method proceeds to block 126 to conduct a thread switch. If the countdown timer has not reach a pre-defined time interval, then the first thread continues to be processed by the CPU at block 118.

At decision diamond 124, it is determined whether there is a cache miss, a stall in the pipeline, or some other on-chip cache miss well known to those skilled in the art. If an on-chip cache miss occurs then method proceeds to block 126, where a thread switch from second thread, T1, to the first thread, T1, occurs. If an on-chip cache miss does not occur, then thread T0 continues to be processed by the retrofitted CPU in block 118.

At block 126, a thread switch from the second thread, T1, to the first thread, T0, is completed. As discussed previously, the thread switch may arise from a variety of events including a match between the AACAM and the active thread, T0, the on-chip cache miss, and the timer countdown. The method then proceeds to the process 128.

At block 128, the AACAM copies the memory addresses from the switch out second thread, T1, to the AACAM_T1. More specifically, the AACAM copies the memory address from the second switched out thread, T1, resident in the second thread store buffer, SB_1, and the second thread load buffer, LB 1, to the AACAM_T1 entries. The method then proceeds to process 102 where the thread is enabled and subject to the CPU processing block 104.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A system for avoiding memory hazards, comprising:
   a Central Processing Unit configured to process only a single thread retrofitted to process a first thread and a second thread;
   a level one data cache resident in said Central Processing Unit, said level one cache configured to receive said first thread and said second thread; and
   an external active address content addressable memory external to said Central Processing Unit and coupled to said Central Processing Unit, said active address content addressable memory configured to copy at least one memory address from said first thread and said second thread.

2. The system of claim 1 wherein said active address content addressable memory is adjacent said central processing unit.

3. The system of claim 1 further comprising:
   a first store buffer and a first load buffer associated with said first thread provided by said central processing unit, said first store buffer having a first store memory address, and said first load buffer having a first load memory address; and
   a second store buffer and a second load buffer associated with said second thread, said second store buffer having a second store memory address, said second load buffer having a second load memory address.

4. The system of claim 3 wherein said active address content addressable memory comprises a first active address content addressable memory for storing at least one memory address from said first store buffer and at least one memory address from said first load buffer.

5. The system of claim 4 wherein said active address content addressable memory comprises a second active address content addressable memory for storing at least one memory address from said second store buffer and at least one memory address from said second load buffer.

6. The system of claim 5 further comprising logic in said active address content addressable memory configured to receive an address to be accessed by said second thread from said Central Processing Unit and compare said address to said at least one memory address stored in said first active address content addressable memory and to cause a thread switch responsive to a match between said at least one address in said first active address content addressable memory and said address to be accessed.

7. The system of claim 6 further comprising logic in said active address content addressable memory configured to receive an address to be accessed by said first thread from said Central Processing Unit and compare said address to said at least one memory address stored in said second active address content addressable memory and to cause a thread switch responsive to a match between said at least one address in said second active address content addressable memory and said address to be accessed.

8. A method for avoiding memory hazards in a Central Processing Unit retrofitted for concurrently processing multiple threads, comprising:

modifying said central processing unit that is configured to process a single thread in a manner to configure said Central Processing Unit to process a first thread and a second thread;

executing a first thread in said Central Processing Unit, said first thread using a first store buffer, a first load buffer, and a L-1 data cache;

switching execution from said first thread to a second thread;

copying at least one memory address from a one of said first store buffer and said first load buffer to an active address content addressable memory that is external to said Central Processing Unit and coupled to said Central Processing Unit having a first active address content addressable memory;

executing said second thread in said Central Processing Unit, said second thread using a second store buffer, a second load buffer, and said L-1 data cache;

transmitting a memory address being accessed by said second thread during execution from said Central Processing Unit to said active address content addressable memory;

determining if there is a match between said at least one memory address in said first active address content addressable memory and said memory address being accessed by said second thread; and switching execution from said second thread to said first thread responsive to a determination that said match exists.

9. The method of claim 8 further comprising:

switching execution from said second thread to said first thread;

copying at least one memory address from a one of said second store buffer and said second load buffer to an active address content addressable memory is external to said Central Processing Unit and coupled to said Central Processing Unit having a second active address content addressable memory;

executing said first thread in said Central Processing Unit, said second thread using said first store buffer, said first load buffer, and said L-1 data cache;

transmitting a memory address being accessed by said first thread during execution from said Central Processing Unit to said active address content addressable memory;

determining in said active address content addressable memory if there is a match between said at least one memory address in said second active address content addressable memory and said memory address being accessed by said first thread; and switching execution from said first thread to said second thread responsive to a determination that said match exists.

* * * * *